May 4, 1943.   A. L. RUSSELL ET AL   2,318,103
SHOEMAKING METHOD
Filed April 30, 1941   4 Sheets-Sheet 2

INVENTORS
Arthur L. Russell
William M. Watson
By their attorney

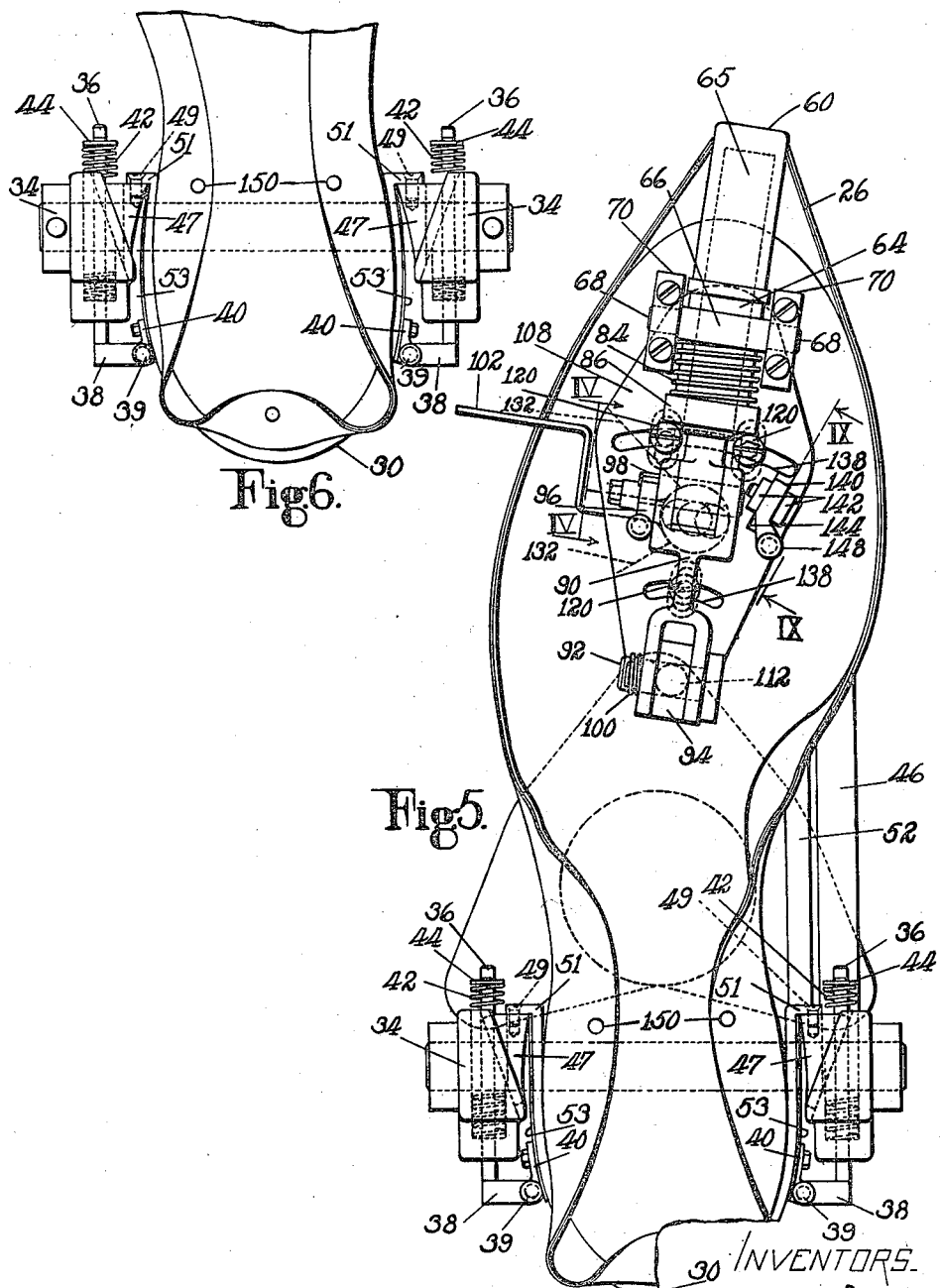

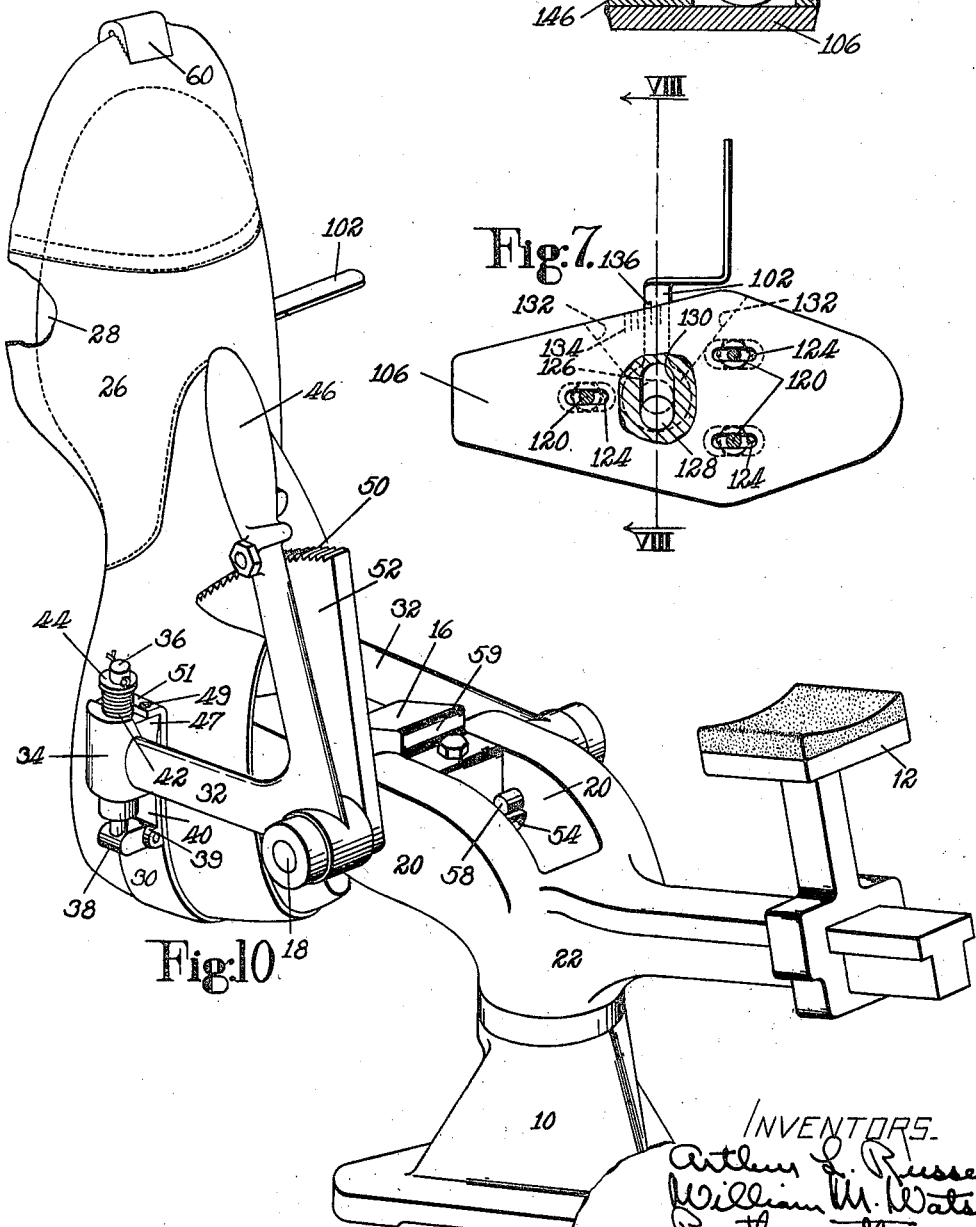

Patented May 4, 1943

UNITED STATES PATENT OFFICE 2,318,103

SHOEMAKING METHOD

Arthur L. Russell and William M. Watson, Boston, Mass., assignors to United Shoe Machinery Corporation, Flemington, N. J., a corporation of New Jersey Application April 30, 1941, Serial No. 391,106

17 Claims. (Cl. 12—145)

This invention relates to shoemaking methods and is herein illustrated in its application to methods of assembling lined uppers and counters on their lasts and shaping such uppers over their lasts.

In shaping shoe uppers over lasts, it is a general shoemaking practice to assemble the rear part of the upper and a cement-treated counter on the heel end of a last and thereafter to tension the upper lengthwise by means of a machine having a toe gripper for performing the lengthwise tensioning operation. It frequently happens that the lengthwise tension thus applied to the upper displaces the wings of the counter. Before proceeding with the side-lasting operation, the counter wings, if displaced in the upper-tensioning operation, must be relocated. This involves breaking the cement bond between the counter and the upper and between the counter and the lining if the cement has set during the interval between the upper-tensioning and side-lasting operations.

It is an object of the present invention to improve present shoemaking methods so as to maintain control of the wings of the counter during the lengthwise tensioning of the upper. It is a further object of the invention to maintain such lengthwise tension of the upper by means portable with the last during the lasting operations.

With the above objects in view, the present invention comprises a method of making shoes which consists in gripping or clamping the rear part of an upper against the last to hold the upper in assembled position on the last, while the upper is thus gripped, mounting on the forepart of the last an upper-stretching member portable with the last, operating said member to stretch the upper while the rear part of the upper is thus gripped against the last, and securing the lasting margin of the upper to an insole on the last bottom while the upper is held under tension by said stretching member. In practicing the method above defined, the present invention contemplates the use of a portable upper-stretching member to hold the upper under lengthwise tension while the upper is lasted in any known manner. This invention also contemplates the use of an upper-stretching member portable with the last in conjunction with a last-supporting mechanism which permits the last to be moved into a position to expose the toe portion of the upper to the view of the operator to enable the operator to locate the tip seam and the throat of the upper accurately with relation to the last.

In another aspect thereof, this invention resides in a method of making shoes which comprises assembling on a last the rear part of an upper together with a counter to which slow-setting adhesive has been applied, gripping the back-seam portion of the upper against the last, tensioning the upper lengthwise by means portable with the last, lasting the breast line portions of the upper and lining, positioning the wings of the counter before the counter adhesive begins to set, then clamping the breast line portions of said parts against the last, and finally fastening the bottom margins of the breast line portions of said parts to an insole on the last bottom.

While it is within the scope of the present invention to employ any suitable means for applying lengthwise tension to the upper, the drawings illustrate the practice of the method by the use of an upper-tensioning means which is the subject of our co-pending application Serial No. 447,226, filed June 16, 1942, as a division of the present application.

The invention will now be described with reference to the accompanying drawings, illustrating apparatus for use in practicing the method of the present invention.

In the drawings:

Fig. 5 is a plan view illustrating the toe-stretching device and rear-part-clamping means in operation on an upper on its last;

Fig. 6 is a plan view of the rear-part-clamping means on the rear part of an upper in a position different from that shown in Fig. 5;

Fig. 7 is a plan view of the base of the toe-stretching device with parts broken away and other parts shown in section;

Fig. 8 is a section on the line VIII—VIII of Fig. 7;

Fig. 9 is a section on the line IX—IX of Fig. 5; and

Fig. 10 is a perspective view illustrating the jack, the upper-stretching apparatus and an upper as it appears after the upper-stretching operation has been completed.

Figure 1:
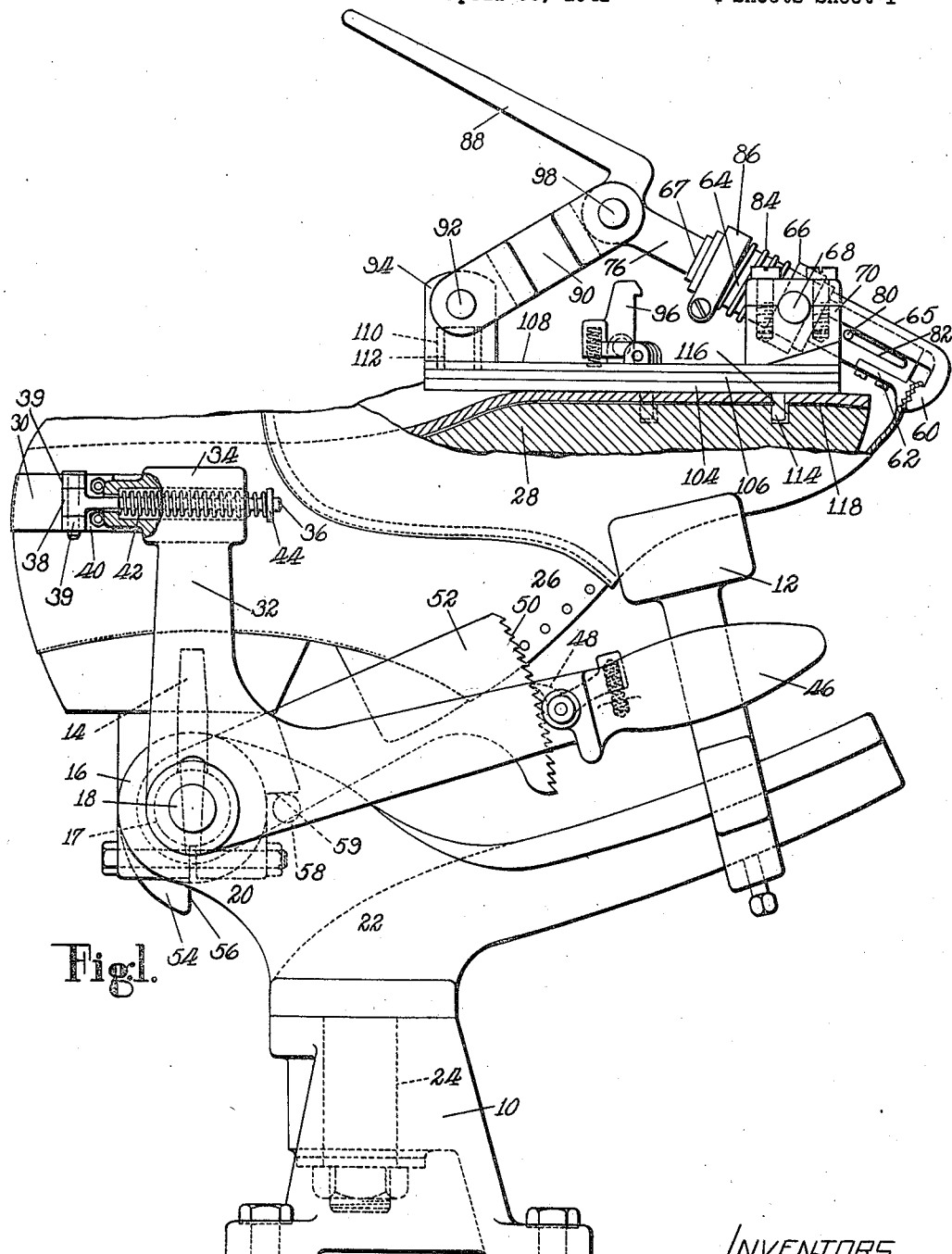
Fig. 1 is a side elevation illustrating a jack and an upper-stretching apparatus, said apparatus being mounted on the forepart of a last and insole, shown partly in section.

In practicing the method of the present invention, a last and an upper thereon are supported on a jack (Fig. 1) mounted on a bench standard 10. The illustrated jack is provided with a toe rest 12 and a last pin 14 extending upwardly from a block 16. The block 16 is arranged for rotary movement about a horizontal axis by securing it to a sleeve 17 journaled in parallel arms 20 (Figs. 1 and 10) of a carriage 22. This arrangement of the block 16 permits a supported last and upper, for example, the upper 26 and last 28 illustrated in the drawings, to be swung upwardly from the horizontal position in Fig. 1 to the vertical position in Fig. 10 to permit the operator to observe the position of the toe portion of the upper on the last after the upper has been stretched and if necessary, to adjust the toe portion of the upper relatively to the last. The carriage 22 has a downwardly extending stem 24 which is journaled in the standard 10 to permit the jack and the shoe thereon to swing freely about a vertical axis to enable the operator to arrange the shoe to the best advantage for hand lasting opposite side portions thereof. For holding the rear part of the upper against the last 28 a heel band 30 is supported and actuated by a carrier comprising parallel arms 32 (Fig. 10) secured to opposite ends of a cross shaft 18 journaled in the sleeve 17 and arranged to project outwardly therefrom. At their upper ends the arms 32 have heads 34 which are drilled and counterbored (Fig. 1) in the direction of the length of the shoe to receive stems 36 having heads 38 which are offset inwardly from the stems (Fig. 5) and pivoted between lugs 39 on plates 40 secured to the opposite sides of the heel band. The stems 36 are surrounded by springs 42 which are confined between the bases of the counterbores in the heads 34 and washers 44 on the ends of the stems. When these springs are energized by the operation of the arms 32 they exert a continuous pull on the opposite ends of the heel band 30 to hold the rear part of the upper in position on the last during the operation of the toe-stretching device hereinafter described. For operating the arms 32 a handle 46 extends at nearly a right angle from one of the arms. The handle 46 is operated in two stages, first, to clamp the back-seam portion of the upper, counter and lining against the end of the last and, at a later stage in the operations on the shoe, to move the end portions of the band inwardly thereby to clamp the upper, counter and lining at opposite sides of the heel portion of the upper against the last. During the first stage of the operation of the handle 46, the springs 42 are only slightly compressed and, consequently, there is only slight movement of the heads 34 relatively to the end portions of the heel band 30; but during the second stage in the operation of the handle 46, the heads 34 move toewardly relatively to the heel band 30 and exert a camming action on wedge-shaped members 47 (Fig. 5) to move the end portions of the heel band inwardly from their position in Fig. 5 to their position illustrated in Fig. 6 against the action of spring plates 53 which tend to move the end portions of the band outwardly into their open position. Said wedge-shaped members are secured by screws 49 to outturned end portions 51 of the heel band. The outer edge faces of said wedge members are arranged to diverge toewardly of the upper, said divergent portions of the wedges having tongue-and-groove connections with similarly divergent portions of the heads 34. The outer portions of the wedges are recessed longitudinally to provide clearance for the springs 42. During the operations of the heel band, the last 28 is rigidly held by the last pin 14 which is itself held against swinging movement by a pin 58 projecting outwardly from one of the arms 20 and arranged to engage a shoulder 59 provided in the block 16. For holding the heel band 30 in upper-gripping position the handle 46 carries a spring-pressed detent 48 which engages ratchet teeth 50 in the end face of an arm 52 secured to the sleeve 17.

For holding the last and upper in the position illustrated in Fig. 10, the block 16 is provided with an extension 54 having a radial face 56 (Fig. 1) which engages the pin 58 to hold the block 16 at the limit of its counter-clockwise movement.

Figure 2:
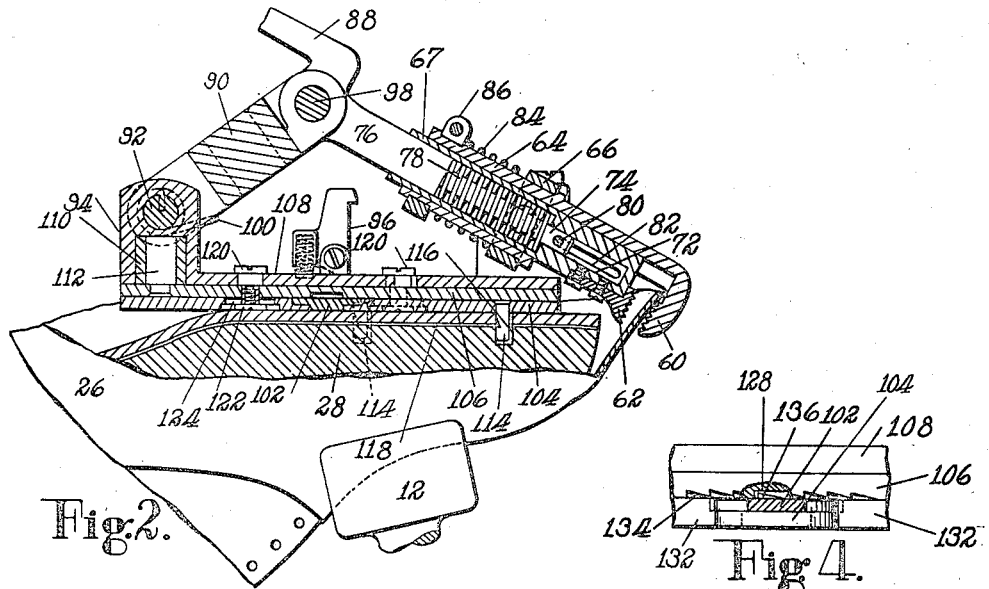
Fig. 2 is a side elevation showing the upper-stretching device illustrated in Fig. 1 in position on the forepart of a last, said stretching device and part of the last being shown in section on their longitudinal center lines.
Figure 3:
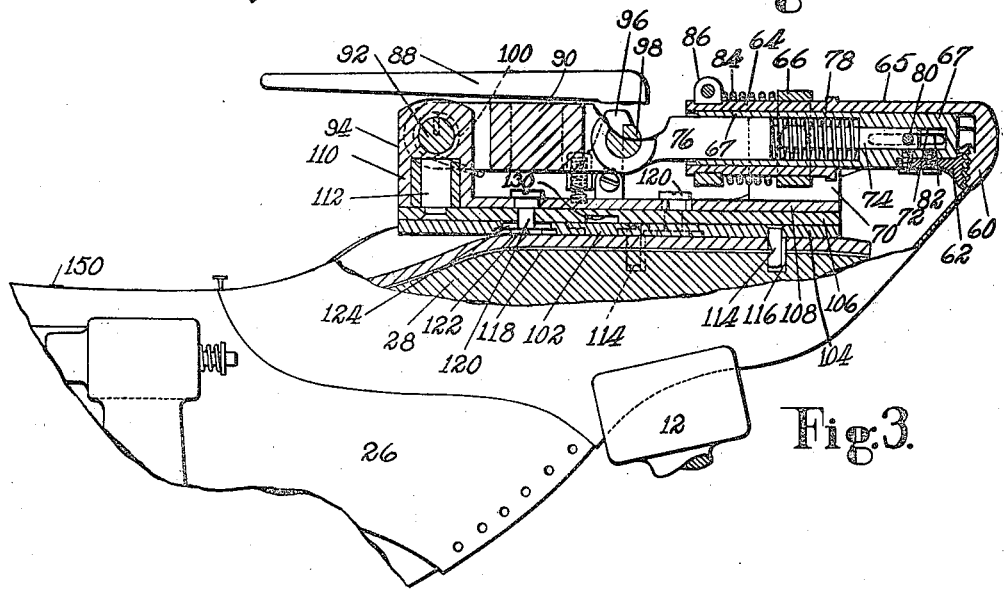
Fig. 3 is a view similar to Fig. 2 showing the upper-stretching device in upper-tensioning position.

The illustrated toe-stretching device comprises a gripper which consists of a jaw 60 (Figs. 2 and 3) constructed and arranged to engage the outer or grain face of the upper and a jaw 62 which engages the inner surface of the upper. The outer jaw 60 is formed in a hollow cylindrical slide 64 the outer end portion 65 of which has its lower portion cut away to provide clearance for the movement of the jaw 62. The slide 64 is mounted on the hollow shank portion 67 of the gripper jaw 62. The gripper assembly is slidably mounted in a collar 66 which, as shown in Fig. 5, is provided with trunnion pins 68 which turn in bearing members 70. The shank portion 67 of the inner gripper jaw 62 is provided with a longitudinal bore 72 (Fig. 2) in which slides a stem 74 projecting from a plunger 76 which is slidably mounted in a counterbore in said shank portion. The grippers are operated by movement of the plunger 76 to the right, as seen in Fig. 2, said plunger acting through a spring 78 surrounding the stem 74 and confined between the end face of the plunger and the base of the counterbore in the shank portion of the inner gripper jaw to move the inner jaw toward the outer jaw. The stem 74 carries a cross pin 80 (Fig. 3) which extends into longitudinal slots 82 in the shank portion of the gripper jaw 62. This cross pin prevents the spring 78 from drawing the stem 74 out of the bore 72 and also enables the plunger 76 by movement to the left, as seen in Figs. 2 and 3, to open the gripper jaws. After the gripper jaws are closed on the upper, continued advancement of the plunger 76 moves the gripper as a unit to the right, as seen in Fig. 3, to impart longitudinal tension to the upper. During such bodily movement of the gripper the slide 64 which carries the outer gripper jaw moves through the collar 66 compressing a spring 84 surrounding the shank portion 64 and confined between the collar 66 and a collar 86 clamped to the end of the slide 64. It will be understood that the spring 84 serves to retract the gripper assembly into its rest position. For operating the gripper the plunger 76 has an extension 88 (Fig. 1) which serves as a hand lever which the operator moves downwardly first to close the gripper jaws on the work and then to move the gripper bodily to tension the upper over the last. To effect longitudinal movement of the plunger 76 by the depression of the member 88 the plunger is fulcrumed on a link 90 one forked end of which, as shown in Fig. 5, is pivoted on a headed cross pin 92 in a post 94. It will be seen that the gripper in the course of its operative movement swings about the trunnion pins 68 while moving longitudinally through the collar 66 and that the resulting upper-stretching movement has components both lengthwise and heightwise of the last. The gripper is held in the position illustrated in Fig. 3 with the upper under tension by a spring-pressed latch 96 which engages a slabbed off extension of a cross pin 98 connecting the plunger 76 and the link 90. For opening the gripper jaws after the upper-stretching operation has been completed, a torsion spring 100 (Fig. 5) is mounted on and anchored to an outward extension of the cross pin 92 and its free end is arranged to engage the link 90.

Figure 4:
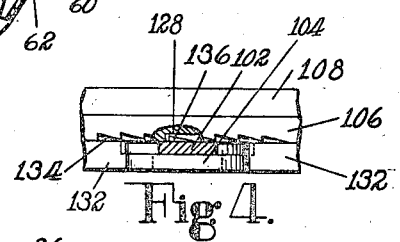
Fig. 4 is a section on the line IV—IV of Fig. 5.

After the gripper has been operated to apply lengthwise tension to the upper, the jack together with the last and upper may be swung upwardly into their slightly backwardly inclined position, illustrated in Fig. 10, in order to enable the operator to examine the toe portion of the upper on the last to determine whether any lengthwise or widthwise adjustment of the upper is required to bring the tip line or the throat into proper relation to the last. If lengthwise adjustment is required, a hand lever 102 is operated to move the gripper bodily toward or from the toe end of the last as may be required, said hand lever operating through mechanism hereinafter described. If widthwise adjustment is required to correct the position of the throat opening, the gripper assembly is swung about an axis extending heightwise of the last at the heelward extremity of the toe-stretching device. In order to provide for such adjustments, the base portion of the toe-stretching device comprises three plates, namely, a base plate 104 (Figs. 2 and 3), an intermediate plate 106 constructed and arranged to slide lengthwise of the last on the base plate, and a top plate 108 which carries the bearing members 70 and the post 94 and is arranged to swing widthwise of the last on the intermediate plate. The base of the post 94 is bored to receive a roll 110 mounted on a stud 112 secured to the intermediate plate 106. The roll 110 provides the fulcrum on which the top plate 108 together with the upper-stretching mechanism swings to afford widthwise adjustment of the toe portion of the upper. For removably anchoring the toe-stretching device to the last, the base plate 104 has three downwardly extending pins 114 which enter sockets 116 provided in the last 28 and are notched to engage a metal plate 118 secured to the sole face of the last and arranged to project slightly beyond the heelward extremities of said sockets to enter the notches provided in the pins 114, as shown in Figs. 2 and 3. The lengthwise strain on the upper, when the toe-stretching device is in its operative position, illustrated in Fig. 3, urges the device heelwardly and thus holds the pins 114 in position to engage the last plate 118. The intermediate plate 106 is held against separation from the base plate 104 by hollow pins 120 which, as illustrated in Fig. 2, are internally threaded to receive headed screws 122. The pin-and-screw assemblies 120, 122 extend through longitudinal T-slots 124 provided in the base plate 104, said slots affording adjustment of the gripper assembly lengthwise of the last (Fig. 7). For effecting such longitudinal adjustment of the gripper assembly, the hand lever 102 is pivoted at 126 (Fig. 8) to the base plate 104 and carries an upwardly extending eccentric stud 128 which operates in a transverse groove 130 (Figs. 7 and 8) in the bottom of the intermediate plate 106. A segmental portion of the base plate is cut out, as indicated by dotted lines 132 in Fig. 7, to provide clearance for the operation of the lever 102. To hold the lever in adjusted position, the bottom surface of the intermediate plate 106 is provided with ratchet teeth 134 (Fig. 4) and the lever 102 is provided with a suitable detent 136. In order to permit widthwise swinging movement of the gripper assembly about the roll 110, the top plate 108 is provided with arcuate slots 138 (Fig. 5) which receive the headed ends of the pins 120. To hold the top plate in adjusted position widthwise of the last, an eccentric clamping disk 140 (Figs. 5 and 9) is pivoted between ears 142 extending upwardly from the top plate 108 at opposite sides of a slot 144 through which the disk extends for clamping engagement with the intermediate plate 106. The disk 140 is operated by the expansion of a spring 146 mounted in an extension 148 of the disk and arranged to act against the top plate 108, and is released by pressure against the headed end of said extension.

In accordance with the preferred method of making shoes with the aid of the illustrated apparatus, a counter to which a slow-setting adhesive has been applied is assembled with a lined upper. While it is within the scope of the invention to assemble the upper and counter with the last in any known manner, we prefer to employ for this purpose a machine such as that illustrated in United States Letters Patent 2,162,802, granted June 20, 1939, on an application of Karl Engel. This machine dips a molded counter into the counter adhesive, then moves the counter into position for assembly with the upper. The upper is then positioned relatively to the counter, preferably with the quarter lining drawn out of the upper to facilitate the location of the upper about the counter. The quarter lining is then manually wiped downwardly against the cement-treated inner surface of the counter whereupon a last is inserted through the bottom opening of the upper and then turned on a transverse axis to wipe the heel end of the last downwardly against the quarter lining thereby to work the quarter lining smoothly into contact with the counter. The last with the upper and counter thereon are then transferred from the Engel machine to the jack illustrated in Fig. 1. The heel band 30 is first advanced into its position illustrated in Fig. 5 in which position it clamps the back-seam portion of the upper against the last but leaves the breast line portions of the upper, counter and lining sufficiently free to permit the operator to tension the shoe parts heightwise of the last, as may be required in the breast line lasting operation. The toe-stretching device is now positioned on the last bottom and located in predetermined position by the engagement of the pins 114 in their sockets whereupon the lasting margin at the toe end of the upper is positioned between the gripper jaws and the hand lever 88 is moved downwardly first to close the jaws and then to apply lengthwise tension to the upper, the spring 84 yielding to avoid injury to the upper by the operation of the hand lever. In some cases it may be found desirable to operate the upper-stretching device before bringing the heel band into clamping engagement with the back-seam portion of the upper. It might, for example, be found desirable to apply heightwise tension to the back-seam portion of the upper after the toe-stretching device has been operated to tension the upper lengthwise. After clamping the back-seam portion of the upper against the last and tensioning the upper lengthwise by means of the toe-stretching device, the last and upper are tilted upwardly into their position illustrated in Fig. 10 to enable the operator to inspect the upper to determine whether the tip and throat are correctly positioned on the last. While the upper is in this position, any required adjustment is made by either operating the lever 102 or swinging the gripper assembly laterally as may be necessary. Inasmuch as no fastenings have been driven through the upper and into the last up to this point, any required adjustment is easily and quickly made. The jack is now swung back into its horizontal position to locate the last and upper for the ball lasting and breast line lasting operations which are manually performed by means of the usual hand lasting pincers. The order of these two operations may be varied with different types of work but in most cases the ball lasting will be performed first while the side portions of the upper are entirely free from toe to heel to respond to the ball lasting pulls. The swivel mounting of the jack enables the operator to pull up and fasten the ball portion at the inner or great toe side of the upper and then rotate the jack to position the upper conveniently for pulling and fastening the ball portion at the opposite side. In the breast line lasting operation, the operator is concerned mainly with the correct positioning of the wings of the counter relatively to the upper and lining and to the last. It is therefore important that whatever the sequence of lasting operations may be, the breast line lasting be performed before the adhesive on the counter has begun to set.

After the lasting of the breast line portions of the upper has been completed, the lever 46 is further depressed to cause the heel band 30 to clamp the breast line portions against the last. The breast line portions of the upper may now be secured in position by manually working the lasting margin over the insole and securing it by suitable fastenings, for example, tacks 150 illustrated in Fig. 3.

In order to complete the preparation of the upper for the toe lasting operation the tip portion of the upper is now tensioned heightwise of the last to bring it into intimate contact with the last and secured to the insole on the last bottom. This operation is preferably performed manually while the last and upper are still held by the jack. After a final inspection of the upper, the heel band 30 is released and the last and upper are removed from the jack.

The upper is now in condition for the side lasting and heel end lasting operations, the sequence of which is of no importance so far as this invention is concerned. Preferably, the side portions of the upper would be lasted in a machine such, for example, as that illustrated in United States Letters Patent No. 1,815,295, granted July 21, 1931, on an application filed in the name of George Goddu. This machine draws the upper heightwise of the last and inwardly over the insole and secures the upper to the insole by means of staples. The heel end of the upper is preferably lasted in a machine such, for example, as that illustrated in United States Letters Patent No. 1,558,737 granted October 27, 1925, on an application of Ronald F. McFeely.

For lasting the toe portion of the upper, the last and upper are positioned in a bed lasting machine such, for example, as that illustrated in United States Letters Patent No. 1,495,169 granted May 27, 1924, on an application of Joseph Fausse et al., and while the toe portion of the upper is still held by the upper-stretching device the flexible toe band with which the machine illustrated in said patent is provided is brought into clamping engagement with the toe portion of the upper to hold it in position on the last. After thus clamping the toe portion of the upper to the last, the upper-stretching device is released from the upper by merely releasing the latch 96 and thus permitting the torsion spring 100 to open the gripper jaws and to retract them into their rest position, shown in Fig. 2, leaving the device free to be pushed forward and lifted off the last bottom. After the device has been removed the bed lasting machine is operated in the usual manner to last the toe portion of the upper, the upper being secured in lasted position either by cement or by tacks driven by means of the hand tacker with which the bed lasting machine is usually provided. This completes the lasting of the upper and the succeeding operations are performed in the usual manner.

While the method of the present invention has been herein described with special reference to its practice in conjunction with the lasting of shoe uppers in machines commonly used in the manufacture of shoes, it will be understood that the method of the present invention may be practiced in conjunction with the operation of other types of lasting machines or, if desired, the upper could be lasted entirely by hand while supported on the jack above described. Furthermore, the illustrated toe-stretching device is not limited to use with the jack above described but could be applied to the upper after the upper has been assembled on the last and secured to the heel end of the last and insole in the usual manner.

Having thus described our invention, what we claim as new and desire to secure by Letters Patent of the United States is:

1. That method of making shoes which comprises assembling the rear part of an upper on a last, gripping the rear part of the upper against the last by means of a heel band, tensioning the upper lengthwise by means portable with the last and securing the lasting margin of the upper to an insole while the upper is held under tension by said means.

2. That method of making shoes which comprises gripping the rear part of an upper against a last to hold the upper in determinate relation to the last, and while the upper is thus gripped mounting on the forepart of the last an upper-stretching member portable with the last, operating said member to stretch the upper while the rear part of the upper is thus gripped, and securing the lasting margin of the upper to an insole on the last bottom while the upper is held under tension by said stretching member.

3. That method of making shoes which comprises mounting on the forepart of a solid last an upper-tensioning member so constructed as to be removably attached to the last, operating said member to impart lengthwise tension to an upper on the last, while the upper is held tensioned by said member, securing portions of the lasting margin of the upper to an insole on the last bottom, completing the lasting of the upper, and securing an outsole to the shoe bottom.

4. That method of making shoes which comprises anchoring to the forepart of a solid last an upper-tensioning member so constructed as to be removably attached to the last, operating said member to impart lengthwise tension to the upper, lasting the heel end of the upper while the upper is held under lengthwise tension by said member, completing the lasting of the upper, and securing an outsole to the shoe bottom.

5. That method of making shoes which comprises anchoring to the forepart of a solid last an upper-tensioning member so constructed as to be removably attached to the last, operating said member to impart lengthwise tension to the upper, and while the upper is held tensioned by said member presenting the last and upper to a machine for lasting the heel end of the upper, operating the machine to perform the heel-end-lasting operation, completing the lasting of the upper, and securing an outsole to the shoe bottom.

6. That method of making shoes which comprises anchoring to the forepart of a solid last an upper-tensioning member so constructed as to be removably attached to the last, operating said member to impart lengthwise tension to the upper, and while the upper is held under tension by said member presenting the last and upper to a machine for progressively lasting the side portions of the upper, operating said machine to perform the side-lasting operation, completing the lasting of the upper, and securing an outsole to the shoe bottom.

7. That method of making shoes which comprises mounting on the forepart of a solid last an upper-stretching member so constructed as to be removably attached to the last, operating said member to stretch the upper lengthwise and to position the forepart of the upper accurately relatively to the forepart of the last, while the upper is held by said member, securing the lasting margin of the upper to the insole on the last bottom, removing said upper-stretching member from the last, and completing the shoe.

8. That method of making shoes which comprises gripping the rear part of an upper against a last to hold the upper in determinate position on the last, mounting on the forepart of the last an upper-tensioning member so constructed as to be removably attached to the last, operating said member to impart lengthwise tension to the upper, and while the upper is held tensioned by said member lasting the upper at selected points and securing the lasting margin of the upper to an insole on the last bottom.

9. That method of making shoes which comprises gripping the rear part of an upper against a last by means constructed and arranged to permit the last to be moved into a position to expose the toe portion of the upper to the view of the operator, mounting on the forepart of the last an upper-stretching member portable with and adjustable on the last, operating said member to stretch the upper while the rear part of the upper is thus gripped against the last, moving the last into toe-exposing position and adjusting the upper-stretching member to locate the tip seam accurately with relation to the last.

10. That method of making shoes which comprises assembling the rear part of an upper together with a counter on a last, gripping the rear part of the upper against the last by means of a heel band, tensioning the upper lengthwise by portable means constructed and arranged to engage the toe end only of the upper, imparting lasting strains to the ball portion of the upper, and securing the lasted ball portion of the upper to an insole while the upper is held under lengthwise tension by said means.

11. That method of making shoes which comprises assembling the rear part of an upper together with a counter on a last, gripping the rear part of the upper against the last by means of a heel band, tensioning the upper lengthwise by portable means constructed and arranged to engage the toe end only of the upper, imparting lasting strains to the heel breast portion of the upper, and securing the lasted heel breast portion to an insole while the upper is held under legnthwise tension by said means.

12. That method of making shoes which comprises assembling the rear part of an upper together with a molded counter on a last, gripping the rear part of the upper against the last by means of a heel band, tensioning the upper lengthwise by means portable with the last, thereafter operating on the upper with hand-lasting pincers to impart lasting strains to the ball and breast portions of the upper, and securing the lasted ball and breast portions to an insole while the upper is held under lengthwise tension by said means.

13. That method of making shoes which comprises assembling the rear part of an upper together with a molded counter on a last, gripping the rear part of the upper against the last by means of a heel band, tensioning the upper lengthwise by means portable with the last, imparting lasting strains to the heel breast portion of the upper, thereafter pressing the upper and the wings of the counter firmly against the last, and securing the breast portion of the upper together with the wings of the counter to an insole while the upper is held under lengthwise tension by said means.

14. That method of making shoes which comprises assembling the rear part of an upper together with a molded counter on a last, gripping the extremity of the heel portion of the upper against the last by means of a heel band, tensioning the upper lengthwise by means portable with the last, imparting lasting strains to the heel breast portion of the upper, closing the heel band firmly on the upper to press the upper and the wings of the counter in against the last, and securing the breast portion of the upper and the wings of the counter to an insole while the upper is held under lengthwise tension by said means.

15. That method of making shoes which comprises assembling on a last the rear part of an upper together with a molded counter to which slow-setting adhesive has been applied, gripping the back-seam portion of the upper against the last, tensioning the upper lengthwise by means portable with the last, lasting the breast line portions of the upper and lining and positioning the wings of the counter before the counter adhesive becomes effective, clamping the breast line portions of said parts against the last, and fastening the lasting margins of the breast line portions of the upper and lining, together with the flange of the counter, to an insole on the last bottom.

16. That method of making shoes which comprises assembling an upper on its last, mounting the last on a support, stretching the upper lengthwise, moving the last and upper into a position suitable for inspection of the tip and throat portions of the upper while the upper is held under tension but not fastened to the last, making any adjustments of the upper required to position the tip and throat portions of the upper in correct relation to the last, and fastening the upper to the last.

17. That method of making shoes which comprises removably anchoring to the bottom of the forepart of a last an upper-tensioning apparatus movable with the last, operating said tensioning apparatus to impart lengthwise tension to the upper, while the upper is held tensioned by said apparatus presenting the last and upper to a toe-lasting machine having a toe-embracing band, operating said machine to bring the band into toe-embracing position, removing said upper-tensioning apparatus from the last, and completing the toe-lasting operation.

ARTHUR L. RUSSELL.
WILLIAM M. WATSON.